US009678373B2

(12) United States Patent
Tournois et al.

(10) Patent No.: US 9,678,373 B2
(45) Date of Patent: Jun. 13, 2017

(54) DEVICE FOR THE TEMPORAL SHAPING OF THE AMPLITUDE AND PHASE OF ULTRASHORT LIGHT PULSES

(71) Applicant: FASTLITE, Valbonne (FR)

(72) Inventors: Pierre Tournois, Cagnes sur Mer (FR); Nicolas Forget, Orsay (FR)

(73) Assignee: FASTLITE, Valbonne (FR)

( * ) Notice: Subject to any disclaimer, the term of this patent is extended or adjusted under 35 U.S.C. 154(b) by 78 days.

(21) Appl. No.: 14/781,484

(22) PCT Filed: Mar. 31, 2014

(86) PCT No.: PCT/FR2014/050756
§ 371 (c)(1),
(2) Date: Sep. 30, 2015

(87) PCT Pub. No.: WO2014/162087
PCT Pub. Date: Oct. 9, 2014

(65) Prior Publication Data
US 2016/0033797 A1    Feb. 4, 2016

(30) Foreign Application Priority Data

Apr. 5, 2013   (FR) .................................... 13 53087

(51) Int. Cl.
*G02F 1/035*   (2006.01)
*G02F 1/13*    (2006.01)
(Continued)

(52) U.S. Cl.
CPC ........... *G02F 1/1326* (2013.01); *G02B 6/105* (2013.01); *G02B 21/0084* (2013.01);
(Continued)

(58) Field of Classification Search
CPC ..................................................... G02B 6/105
See application file for complete search history.

(56) References Cited

U.S. PATENT DOCUMENTS

| 4,749,248 | A |   | 6/1988 | Aberson, Jr. et al. |
| 5,828,427 | A | * | 10/1998 | Faris ............... G02B 6/0051 |
|           |   |   |        | 348/E13.007 |
| 6,516,103 | B1 |   | 2/2003 | Palese |

FOREIGN PATENT DOCUMENTS

| EP | 0221560 | 5/1987 |
| EP | 1160614 | 12/2001 |

OTHER PUBLICATIONS

Forget et al., "Pulse-measurement techniques using a single amplitude and phase spectral shaper," J. Opt. Soc. Am. vol. 27, No. 4, Apr. 2010, pp. 742-756.

(Continued)

*Primary Examiner* — Sung Pak
*Assistant Examiner* — Hoang Tran
(74) *Attorney, Agent, or Firm* — Young & Thompson

(57) ABSTRACT

A device for the temporal shaping of the amplitude and phase of ultrashort pulses, includes: —a birefringent waveguide 1 of main axis Δ consisting of a nematic liquid crystal 2 located between a photoconductive material 3 and a substrate 4, —two transparent electrodes, one of which 5 is located between the nematic liquid crystal 2 and the substrate 4, and the other 6 such that the photoconductive material 3 is located between the other electrode 6 and the nematic liquid crystal 2, and —projection optics 7 for projecting a programmable optical mask 8 onto the photoconductive material 3.

17 Claims, 3 Drawing Sheets

(51) Int. Cl.
G02F 1/01 (2006.01)
G02F 1/135 (2006.01)
G02B 6/10 (2006.01)
G02B 21/00 (2006.01)
H01S 3/00 (2006.01)

(52) U.S. Cl.
CPC ............ G02F 1/0126 (2013.01); G02F 1/135 (2013.01); H01S 3/0057 (2013.01); *G02F 2203/26* (2013.01)

(56) References Cited

OTHER PUBLICATIONS

Moszczynski et at, "Model for simulation of photo-induced charges inside the hybrid LC cells," Photonics Letters of Poland, vol. 5, 2013, pp. 11-13.
Ogilvie, "Use of coherent control for selective two-photon fluorescence microscopy in live organisms," J. Phys. Chem. A J. Chem. Phys. Science Nature Opt. Express J. Phys. Chem. A, Jan. 23, 2006.
Sang-Hee et al, "How to turn your pump-probe instrument into a multidimensional spectrometer: 2D IR and VIS spectroscopies via pulse shaping," Physical Chemistry Chemical Physics, vol. 11, No. 5, Jan. 1, 2009, pp. 748-761.
Schenkel et al., "Pulse compression with supercontinuum generation in microstructure fibers," J. Opt. Soc. Am. vol. 22, No. 3, Mar. 2005, pp. 687-693.
Verluise et al., "Amplitude and phase control of ultrashot pulses by use of an acousto-optic programmable dispersive filter: pulse compression and shaping," Optics Letters, the Optical Society, vol. 25, No. 5, Apr. 15, 2000, pp. 575-577.

\* cited by examiner

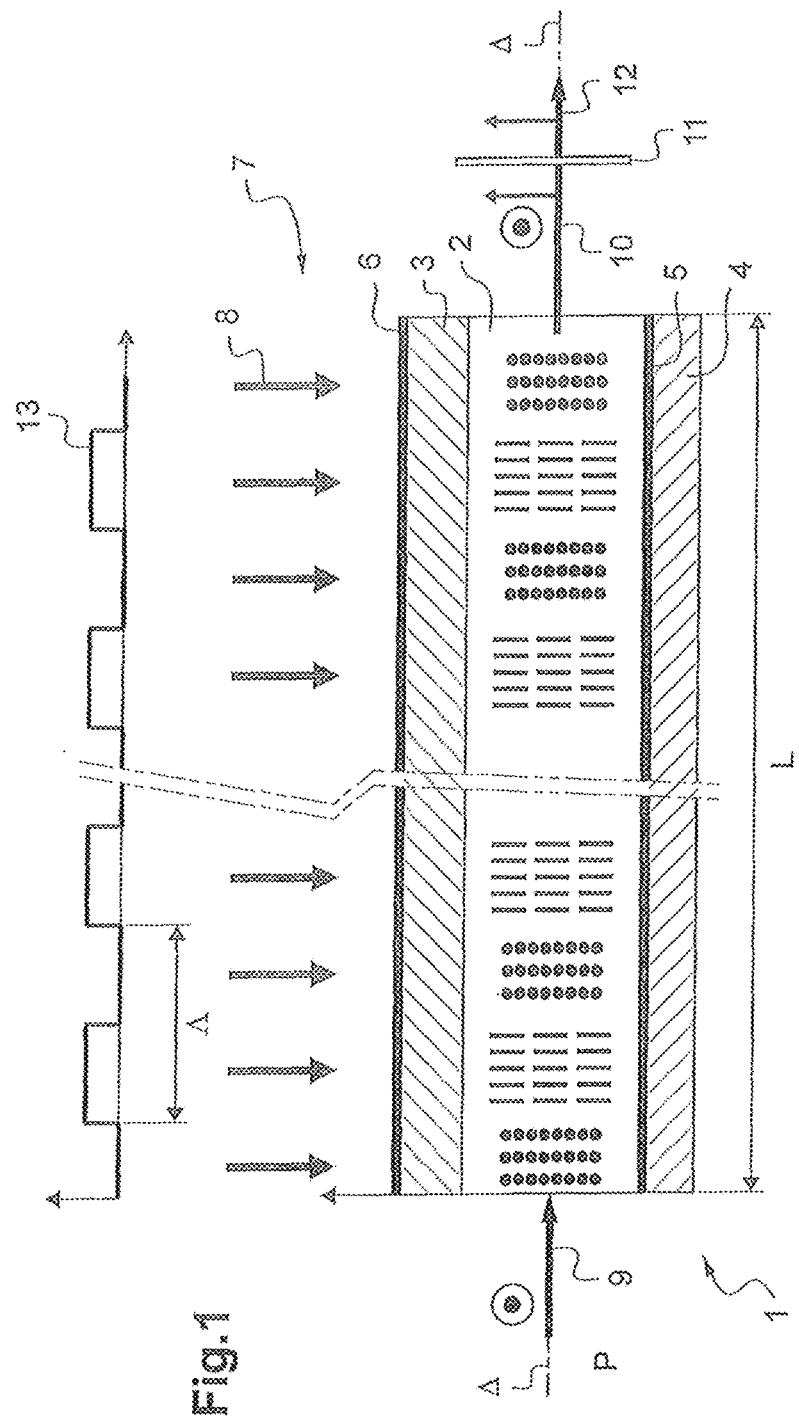

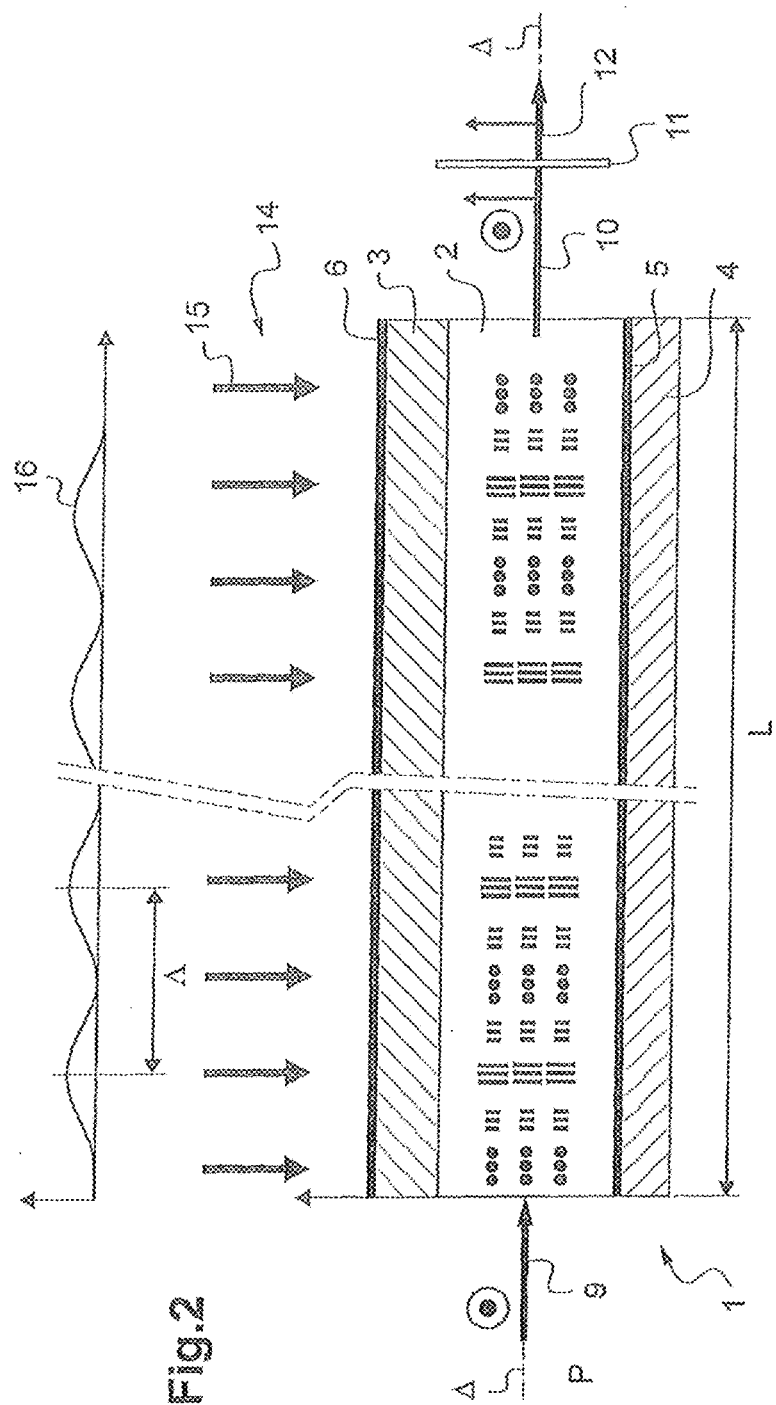

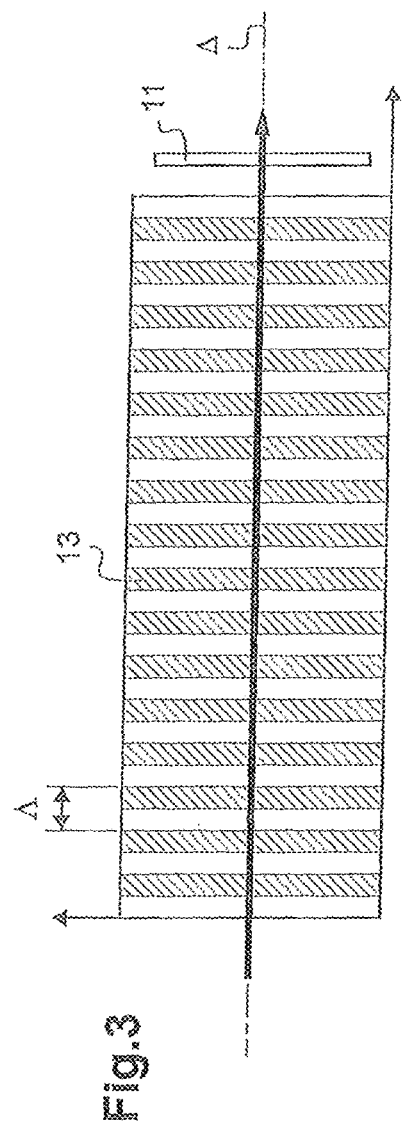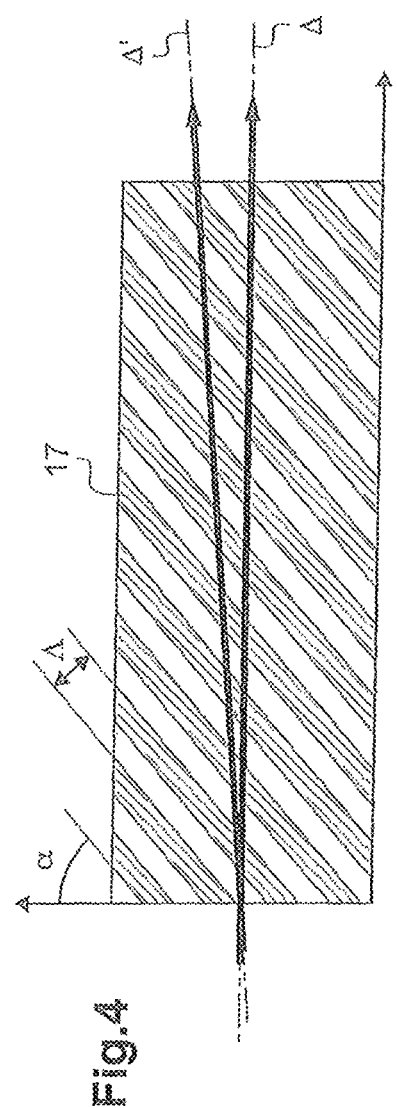

DEVICE FOR THE TEMPORAL SHAPING OF THE AMPLITUDE AND PHASE OF ULTRASHORT LIGHT PULSES

This invention relates to a device for the temporal shaping of the amplitude and phase of ultrashort light pulses.

This device applies in particular to ultrashort light pulses generated by femtosecond oscillators requiring temporal shaping of the amplitude and phase.

In general, it is known that the temporal shaping of the amplitude and phase of ultrashort pulses generated by femtosecond lasers is today performed by means of acousto-optic programmable dispersive filters (AOPDF), such as those described by D. Kaplan and P. Tournois in: J. Phys. IV France 12 (2002) Pr 5-69/75 "Theory and Performance of the Acousto-Optic Programmable Dispersive Filter used for Femto-second Laser Pulse Shaping".

The rate of repetition of the shaping of these filters is limited by the propagation time of the acoustic wave in the length of crystal forming the filter. This maximum rate is generally on the order of 30 kHz, which limits the use of these acousto-optical filters to pulses amplified by femtosecond lasers. For higher rates, such as those generated by femtosecond oscillators, which are on the order of 80 MHz, these filters cannot be applied. To produce filters applicable to these oscillators, it is necessary for the programmable pulse response of the filters, which determines the temporal shaping of the pulses, to be fixed and non-"propagating", like that of AOPDFs.

In the case of AOPDFs, the polarization of the optical wave polarized in a birefringent medium rotates along the propagation thereof, at different points according to each of the optical frequencies (or wavelengths) contained inside the ultrashort pulses.

The propagation, before the polarization rotation, is performed at a speed $v_1$ determined by the optical index $n_1$ of the propagation mode used before the rotation, and, after the polarization rotation, at a speed $v_2$ determined by the index $n_2$ of the propagation mode used after the rotation; the time taken by the optical wave to cover the birefringent medium is dependent upon the wavelength; the propagation is therefore dispersive and programmable; the polarization rotation is ensured by a programmable transverse acoustic wave sent into the birefringent medium.

The objective of the invention is to provide a device enabling the temporal shaping of the amplitude and phase of ultrashort light pulses according to a pulse response of said device, which is programmable and fixed.

The proposed device applies the principle of operation of AOPDFs, but the programming ensured by an acoustic wave is replaced by anon-"propagating" electro-optic programming. The device then becomes an EOPDF, for "Electro-Optic Programmable Dispersive Filter".

The birefringent propagation medium is no longer a crystalline solid as in the case of AOPDFs but a nematic liquid crystal, the elongate molecules of which are oriented perpendicularly to the propagation of the polarized optical wave. When the molecules are aligned parallel to the walls of the liquid crystal, the vertical polarization of the optical wave that is perpendicular to the walls is propagated at a speed $v_1$ determined by the optical index $n_1$ of the liquid crystal in said vertical direction, while the polarization parallel to the walls is propagated at a speed $v_2$ determined by the optical index $n_2$ of the liquid crystal in the horizontal direction.

When the molecules are aligned perpendicularly to the wall of the liquid crystal, it is the horizontal polarization of the optical wave that is propagated at the speed $v_1$ and the vertical polarization of the optical wave at speed $v_2$.

The invention relates to a device for temporal shaping of the amplitude and phase of ultrashort pulses, including:
 a birefringent waveguide consisting of a nematic liquid crystal located between a photoconductor material and a substrate,
 two transparent electrodes located one between said nematic liquid crystal and said substrate and the other above said photoconductor material, and
 optics for projecting a programmable optical mask onto said photoconductor material.

Advantageously, said photoconductor material will be an amorphous silicon layer α-Si:H or a mixed bismuth and silicon oxide (BSO) crystal.

Advantageously, said substrate will be a glass plate or a conductive material plate.

Advantageously, said programmable optical mask projected onto said photoconductor material will be an array of black and white lines with a variable pitch.

Advantageously, said variable-pitch array of the programmable optical mask will consist of gray lines ranging from black to white enabling the amplitude programming to be performed in addition to the phase programming ensured by the pitch of the mask.

The device according to the invention may be applied to the compression and time coding of pulses, at high speeds, emitted by femtosecond lasers, as described by F. Verluise et al. in: Optics Letters, vol. 25, no 8, (2000), p. 575-577 "Amplitude and phase control of ultrashort pulses by use of an acousto-optic programmable dispersive filter: pulse compression and shaping".

Another envisaged application of the device proposed may involve the generation of pulses necessary for time-resolved spectroscopy and multidimensional spectroscopy, as described by Sang-Hee Shim and M. Zanni in: Phys. Chem. Chem. Phys. no 11, (2009), p. 748-761 "How to turn your pump-probe instrument into a multidimensional spectrometer: 2D IR and Vis spectroscopies via pulse shaping".

Another envisaged application of the device proposed may involve the generation of pulses necessary for multiphoton microscopy, as described by Jennifer Ogilvie et al. in: Optics Express, vol. 14, no 2, (2006), p. 759-766 "Use of coherent control for selective two-photon fluorescence microscopy in live organisms".

Another envisaged application of the device proposed may involve the super-continuum compression and filtering generated by femtosecond lasers, as described by B. Schenkel et al. in: JOSA-B, vol. 22, no 3, (2005), p. 687-693 "Pulse Compression with super-continuum generation in microstructure fibers".

Another envisaged application of the device proposed may involve the use in an apparatus for measuring ultrashort pulses emitted by femtosecond lasers, as described by N. Forget et al. in: JOSA-B, vol. 27, no 4, (2010), p. 742-756 "Pulse Measurement techniques using a single amplitude and phase shaper".

One embodiment of a device according to the invention is described below, as a non-limiting example, with reference to the appended drawings, wherein:

FIG. 1 is a schematic representation of the structure of a device according to the invention;

FIG. 2 is a schematic representation of the structure of the device according to another mode of operation;

FIG. 3 is a schematic representation of the operation of the device according to the invention with a non-inclined mask and an output polarizer; and FIG. 4 is a schematic representation of the operation of the device according to the invention with an inclined mask and a spatial separation of the output beam.

In the example shown in FIG. 1, the device according to the invention includes:

- a birefringent waveguide 1 with a main axis Δ formed by a nematic liquid crystal 2 located between a photoconductor material 3 and made of amorphous silicon (α-Si:H) or mixed bismuth and silicon oxide (BSO), and a substrate 4,
- two transparent electrodes located one 5 between said nematic liquid crystal 2 and said substrate 4, and the other 6 so that said photoconductor material 3 is between said other 6 and said nematic liquid crystal 2, and
- optics 7 for projecting a programmable optical mask 8 consisting of black and white lines with a variable pitch Λ onto said photoconductor material 3.

An optical beam 9 is applied at the input of the birefringent waveguide 1 according to a direction colinear with the main axis Δ of said birefringent waveguide 1 and with polarization normal to a median plane P.

The voltage variations induced in the nematic liquid crystal 2 by the photoconductor material 3 cause the molecules to rotate in the plane perpendicular to the optical propagation located in plane P, thus creating a coupling between the optical modes of index $n_1$ and $n_2$.

In order for the energy of the incident mode, at a given wavelength λ of the optical beam 9, to be transferred to the output mode at the same wavelength, it is necessary, when the axis Δ of the array of the optical mask 8 projected is parallel to the optical propagation axis, for its period Λ to be given by:

$$\frac{2\pi}{\Lambda} = K = k_1 - k_2 = \frac{2\pi n_1}{\lambda} - \frac{2\pi n_2}{\lambda},$$

$$\text{that is } \Lambda = \frac{\lambda}{|n_1 - n_2|}$$

For a given wavelength λ=1 μm and $|n_1-n_2|$=0.05, Λ=20 μm.

The programming time T that corresponds to the time length of the pulse response of the EOPDF filter is given by:

$$T = |n_1 - n_2|\frac{L}{c}$$

L being the length of propagation in the liquid crystal and c being the speed of light in a vacuum. For a length L of 1 cm and $|n_1-n_2|$=0.05, T=1.7 picosecond.

The polarization of light in the output mode of the beam 10 being simultaneously colinear and perpendicular to the polarization of light in the input mode of the optical beam 9, when both modes have the same propagation axis parallel to the main axis Δ of said birefringent waveguide 1, it is necessary to place a polarizer 11 at the output of the device 1 in order to select the output mode constituted by the polarization output beam 12 perpendicular to that of the optical input beam 9, with the best signal-to-noise ratio possible.

The projection optics 7 of the programmable optical mask 8 consist of black and white lines with a variable pitch Λ on said photoconductor material 3.

This series of black and white lines may be represented by a series of slots 13 with a period Λ, and makes it possible to perform the phase programming of the optical beam 9.

In the example shown in FIG. 2, the device according to the invention includes:

- the birefringent waveguide 1 with a main axis Δ formed by the nematic liquid crystal 2 located between the photoconductor material 3 and the substrate 4,
- the two transparent electrodes located one 5 between said nematic liquid crystal 2 and said substrate 4, and the other 6 above said photoconductor material 3, and
- optics 14 for projecting a programmable optical mask 15 formed by a series of black, then gray and white lines with a variable pitch Λ onto said photoconductor material 3.

The optical beam 9 is applied at the input of the birefringent waveguide 1 in a direction colinear to the main axis Δ of said birefringent waveguide 1 and with polarization normal to the median plane P.

The voltage variations induced in the nematic liquid crystal 2 by the photoconductor material 3 cause the molecules to rotate in the plane perpendicular to the optical propagation located in plane P, thus creating a coupling between the optical modes of index $n_1$ and $n_2$.

The polarization of light in the output of the beam 10 being simultaneously colinear and perpendicular to the polarization of light in the input mode of the optical beam 9, when the two modes have the same propagation axis parallel to the main axis Δ of said birefringent waveguide 1, it is necessary to place a polarizer 11 at the output of the device 1 in order to select the output mode formed by the polarization output beam 12 perpendicular to that of the optical input beam 9, with the base signal-to-noise ratio possible.

The optics 14 for projection of the programmable optical mask 15 consist of black then gray and white lines with a variable pitch Λ on said photoconductor material 3.

This series of black then gray and white lines may be represented by a series of sinusoids 16 having a period Λ, and makes it possible to perform the amplitude programming in addition to the phase programming of the optical beam 9.

FIG. 3 is a schematic representation of the operation of the device according to the invention with a mask 13 not inclined with respect to the axis Δ and an output polarizer 11.

FIG. 4 is a schematic representation of the operation of the device according to the invention with an inclined mask 17 and a spatial separation of the output beam To avoid having to place, at the output of the device 1, a polarizer 11, the contrast of which may not be perfect, the axis of the line array may be inclined by an angle α with respect to the propagation axis of the input mode parallel to the main axis Δ of said birefringent waveguide 1.

Under these conditions, the pitch of the array is given by:

$$\Lambda = \frac{\lambda \cos\alpha}{|n_1 - n_2|}$$

and the propagation axis of the output mode Δ' is inclined by a small angle θ with respect to the propagation axis of the input mode, which is given by:

$$\sin\theta = \frac{|n_1 - n_2|}{n_1}\tan\alpha$$

For $\lambda=1$ µm, $\alpha=45°$, $n_1=1.5$ and $|n_1-n_2|=0.05$: $\Lambda=14$ µm and $\theta=2°$. Thus, for an interaction length of 1 cm, the axis of the output mode is displaced, in the plane perpendicular to the propagation, by around 350 µm with respect to the axis of the input mode, which makes it possible to separate the output mode from the input mode without having to use a polarizer.

The invention claimed is:

1. Device for a temporal shaping of the amplitude and phase of ultrashort pulses which includes: a birefringent waveguide (1) with a main axis (Δ) formed by a nematic liquid crystal (2) located between a photoconductor material (3) and a substrate (4); two transparent electrodes located one (5) between said nematic liquid crystal (2) and said substrate (4), and the other (6) so that said photoconductor material (3) is located between said other (6) and said nematic liquid crystal (2); and optics (7) for projecting a programmable optical mask (8) onto said photoconductor material (3) wherein said programmable optical mask (8) projected onto said photoconductor material (3) is an array (13) of black and white lines with a variable pitch.

2. Device according to claim 1,
wherein said photoconductor material (3) is an amorphous silicon layer α-Si:H or a mixed bismuth and silicon oxide (BSO) crystal.

3. Device according to claim 1,
wherein said substrate (4) is a glass plate or a conductive material plate.

4. Device according to claim 1,
wherein said programmable optical mask (15) projected onto said photoconductor material (3) is an array (16) of gray lines ranging from black to white with a variable pitch.

5. Device according to claim 1, wherein
said array (13) of black and white lines with a variable pitch is inclined by an angle (α) with respect to the axis (Δ) of said birefringent waveguide (1).

6. Device according to claim 1, further comprising
a polarizer (11) located at the output of said birefringent waveguide (1).

7. Method for compression and time coding of pulses, at high speed, emitted by femtosecond lasers,
which comprises using a device according to claim 1.

8. Method for generating pulses necessary for time-resolved spectroscopy and multidimensional spectroscopy,
which comprises using a device according to claim 1.

9. Method for generating pulses necessary for multiphoton microscopy,
which comprises using a device according to claim 1.

10. Method for super-continuum compression and filtering generated by femtosecond lasers,
which comprises using a device according to claim 1.

11. Method enabling the use in a measurement apparatus of the ultrashort pulses emitted by the femtosecond lasers,
which comprises using a device according to claim 1.

12. Device according to claim 4, wherein said array (13) of black and white lines with a variable pitch is inclined by an angle (α) with respect to the axis (Δ) of said birefringent waveguide (1).

13. Device according to claim 2, further comprising
a polarizer (11) located at the output of said birefringent waveguide (1).

14. Device according to claim 3, further comprising
a polarizer (11) located at the output of said birefringent waveguide (1).

15. Device according to claim 1, further comprising
a polarizer (11) located at the output of said birefringent waveguide (1).

16. Device according to claim 4, further comprising
a polarizer (11) located at the output of said birefringent waveguide (1).

17. Device according to claim 5, further comprising
a polarizer (11) located at the output of said birefringent waveguide (1).

* * * * *